(12) United States Patent
Feng et al.

(10) Patent No.: US 11,727,537 B1
(45) Date of Patent: Aug. 15, 2023

(54) BOKEH EFFECT IN VARIABLE APERTURE (VA) CAMERA SYSTEMS

(71) Applicant: QUALCOMM Incorporated, San Diego, CA (US)

(72) Inventors: Wen-Chun Feng, New Taipei (TW); Hui Shan Kao, New Taipei (TW); Kai Liu, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,361

(22) Filed: Mar. 24, 2022

(51) Int. Cl.
G06T 5/00 (2006.01)
G06T 5/50 (2006.01)
G06T 7/55 (2017.01)

(52) U.S. Cl.
CPC ............... *G06T 5/002* (2013.01); *G06T 5/50* (2013.01); *G06T 7/55* (2017.01); *G06T 2207/20081* (2013.01)

(58) Field of Classification Search
CPC .. G06T 5/005; G06T 5/50; G06T 7/55; G06T 2207/20081; H04N 25/40
See application file for complete search history.

(56) References Cited

U.S. PATENT DOCUMENTS

| 8,355,039 | B2 * | 1/2013 | Michrowski | H04N 7/147 709/204 |
| 8,989,517 | B2 * | 3/2015 | Morgan-Mar | H04N 5/2226 382/280 |
| 9,215,381 | B2 * | 12/2015 | Yang | G06T 7/194 |
| 9,292,926 | B1 * | 3/2016 | Tang | G06T 7/571 |
| 9,307,222 | B1 * | 4/2016 | Tang | H04N 23/676 |
| 9,497,380 | B1 * | 11/2016 | Jannard | H04N 23/90 |
| 9,530,214 | B2 * | 12/2016 | Li | G06T 15/00 |
| 9,734,551 | B1 * | 8/2017 | Esteban | G06T 5/00 |
| 9,787,899 | B1 * | 10/2017 | Hinkel | H04N 23/683 |
| 10,200,599 | B1 * | 2/2019 | Baldwin | H04N 23/745 |
| 10,284,835 | B2 * | 5/2019 | Bishop | H04N 23/743 |
| 10,810,707 | B2 * | 10/2020 | Zhang | G06T 5/002 |
| 11,094,041 | B2 * | 8/2021 | Chen | G06T 7/50 |
| 11,184,553 | B1 * | 11/2021 | Liu | H04N 23/951 |
| 2013/0107002 | A1 * | 5/2013 | Kikuchi | H04N 23/80 348/46 |
| 2016/0042522 | A1 * | 2/2016 | Wajs | G02B 27/1013 348/335 |
| 2019/0208119 | A1 * | 7/2019 | Ekstrand | H04N 23/63 |
| 2020/0394759 | A1 * | 12/2020 | Luo | G06T 7/85 |
| 2021/0183089 | A1 * | 6/2021 | Wadhwa | G06V 20/10 |
| 2021/0390665 | A1 * | 12/2021 | Zhang | G06T 15/005 |
| 2022/0006998 | A1 * | 1/2022 | Busam | G06T 5/50 |

(Continued)

*Primary Examiner* — Brian P Yenke
(74) *Attorney, Agent, or Firm* — Qualcomm Incorporated

(57) ABSTRACT

This disclosure provides systems, methods, and devices for image processing that support enhanced image effects, such as bokeh effect, applied in image processing. In a first aspect, a method of image processing includes determining a depth map corresponding to the first scene based on first image data and second image data captured at different aperture sizes; determining a focus map based on the depth map and a simulated aperture size different from the first aperture size and the second aperture size; and determining an output image frame based on the focus map, the first image data, and the second image data. Other aspects and features are also claimed and described.

30 Claims, 7 Drawing Sheets

(56) References Cited

U.S. PATENT DOCUMENTS

2022/0237813 A1\* 7/2022 Feng ................. G06T 5/002
2023/0091313 A1\* 3/2023 Wu ..................... G06T 5/50
                                                    345/419

\* cited by examiner

BOKEH EFFECT IN VARIABLE APERTURE (VA) CAMERA SYSTEMS

TECHNICAL FIELD

Aspects of the present disclosure relate generally to image processing, and more particularly, to applying effects to captured image data, such as background blurring that replicates a bokeh effect. Some features may enable and provide improved image processing, including improved appearance of photographs of subjects and objects in a scene with objects at multiple depths.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person to be significantly blurred. Lower aperture lenses produce higher blurring than higher aperture lenses. However, lower aperture lenses generally are larger in size and made from higher-cost materials.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Computational photography may be used to process image data and apply effects to scenes, such as the application of a bokeh effect that mimics the blur that conventionally occurs with low aperture lenses. In a variable aperture (VA) camera system, blurring at a different aperture size than available in the VA camera system may be desired. Image processing may be applied to obtain a different aperture size than is available in the VA camera system or different than was used to capture image data. A visual effect on a photograph, such as blurring that replicates a bokeh effect, may be applied through image processing based on image data captured at multiple aperture sizes by controlling an aperture of the VA camera system.

In one aspect of the disclosure, a method for image processing includes receiving first image data captured at a first aperture size and second image data captured at a second aperture size, each of the first image data and the second image data representing a first scene; determining a depth map corresponding to the first scene based on the first image data and the second image data, the depth map comprising first values indicating distances between an image sensor recording the first image data and objects in the first scene; determining a focus map based on the depth map and a simulated aperture size different from the first aperture size and the second aperture size, the focus map comprising second values indicating an amount of blur at the simulated aperture size for the corresponding distances between the image sensor recording the first image data and the objects in the first scene; and determining an output image frame based on the focus map, the first image data, and the second image data.

In an additional aspect of the disclosure, an apparatus includes at least one processor and a memory coupled to the at least one processor. The at least one processor is configured to perform operations including receiving first image data captured at a first aperture size and second image data captured at a second aperture size, each of the first image data and the second image data representing a first scene; determining a depth map corresponding to the first scene based on the first image data and the second image data, the depth map comprising first values indicating distances between an image sensor recording the first image data and objects in the first scene; determining a focus map based on the depth map and a simulated aperture size different from the first aperture size and the second aperture size, the focus map comprising second values indicating an amount of blur at the simulated aperture size for the corresponding distances between the image sensor recording the first image data and the objects in the first scene; and determining an output image frame based on the focus map, the first image data, and the second image data.

In an additional aspect of the disclosure, an apparatus includes means for receiving first image data captured at a first aperture size and second image data captured at a second aperture size, each of the first image data and the second image data representing a first scene; means for determining a depth map corresponding to the first scene based on the first image data and the second image data, the depth map comprising first values indicating distances between an image sensor recording the first image data and objects in the first scene; means for determining a focus map based on the depth map and a simulated aperture size different from the first aperture size and the second aperture size, the focus map comprising second values indicating an amount of blur at the simulated aperture size for the corresponding distances between the image sensor recording the first image data and the objects in the first scene; and means for determining an output image frame based on the focus map, the first image data, and the second image data.

In an additional aspect of the disclosure, a non-transitory computer-readable medium stores instructions that, when executed by a processor, cause the processor to perform operations. The operations include receiving first image data captured at a first aperture size and second image data captured at a second aperture size, each of the first image data and the second image data representing a first scene; determining a depth map corresponding to the first scene based on the first image data and the second image data, the depth map comprising first values indicating distances between an image sensor recording the first image data and objects in the first scene; determining a focus map based on the depth map and a simulated aperture size different from the first aperture size and the second aperture size, the focus map comprising second values indicating an amount of blur at the simulated aperture size for the corresponding distances between the image sensor recording the first image data and the objects in the first scene; and determining an output image frame based on the focus map, the first image data, and the second image data.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
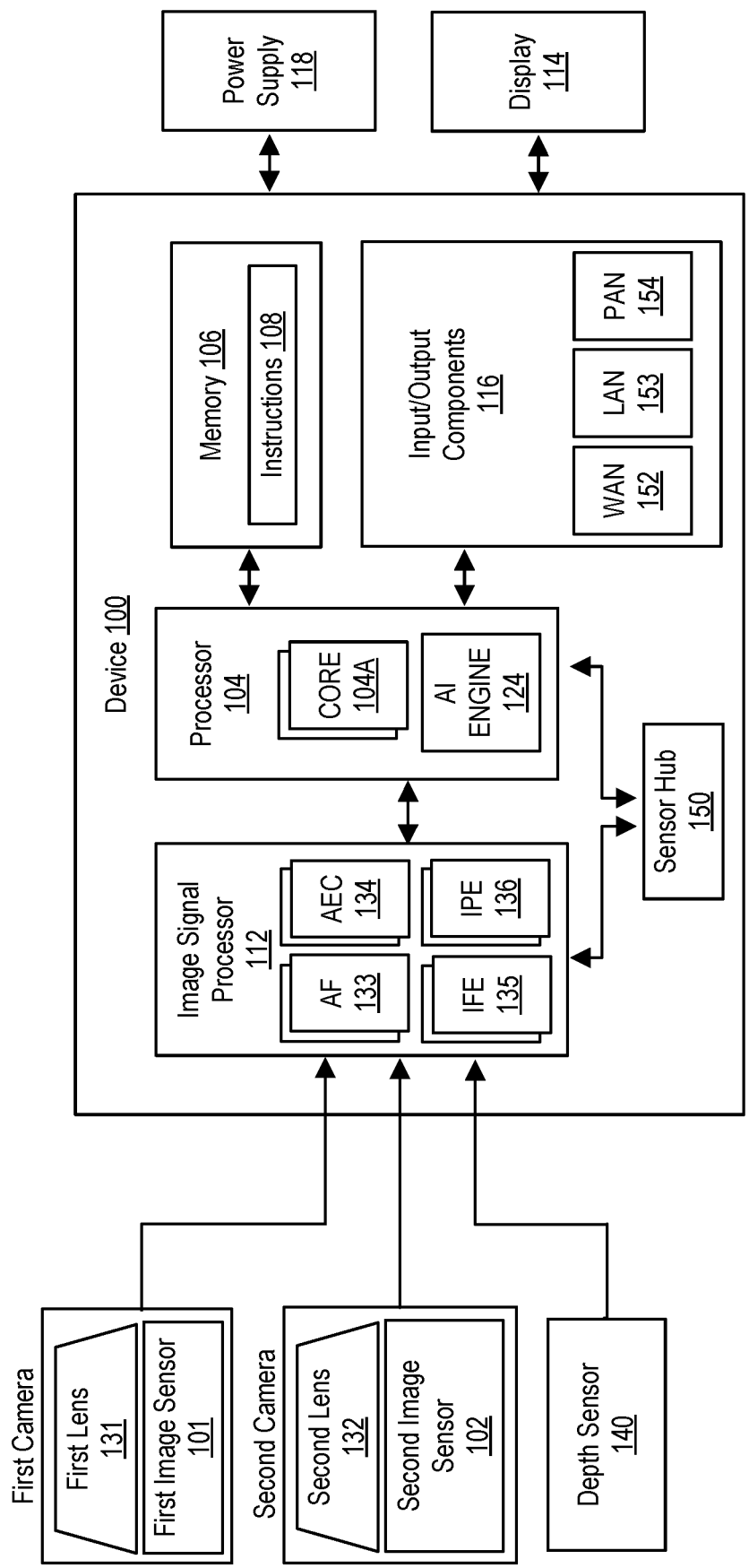
FIG. 1 shows a block diagram of an example device for performing image capture from one or more image sensors according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved image processing for applying effects to image data captured by a camera system, such as a variable aperture (VA) camera system. The improved image processing may use image data captured at two (or more) different aperture sizes to generate a focus map that may be combined with predetermined relationships for aperture sizes to apply bokeh to a scene captured by the image data from multiple aperture sizes.

Particular implementations of the subject matter described in this disclosure may be implemented to realize one or more of the following potential advantages or benefits. In some aspects, the present disclosure provides techniques for improving image appearance by producing more natural effects, such as the bokeh effect, which provides appearances more similar to natural effects obtained through optical systems. This may allow a camera system with smaller available aperture sizes to replicate the photographic effect available to camera systems with larger available aperture sizes that are generally more expensive and less portable.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and/or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112. The ISP 112 may additionally execute an automatic white balancing (AWB) engine for performing white balancing operations. The AWB engine may execute in, for example, the image front ends (IFEs) 135 or other dedicated or general processing circuitry within the ISP 112 or the image capture device 100, such as on a digital signal processor (DSP).

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
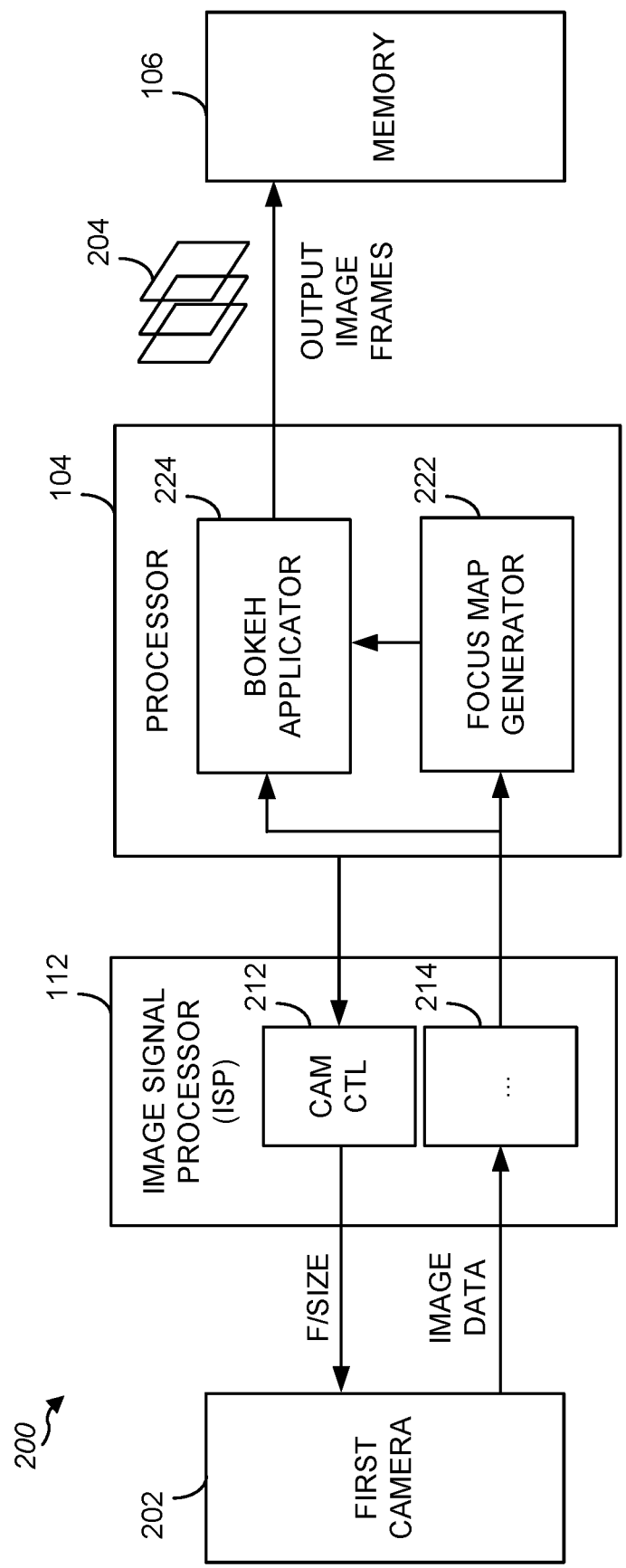
FIG. 2 shows a block diagram of an example processing configuration for applying a bokeh effect according to one or more aspects of the disclosure.

FIG. 2 shows a block diagram of an example processing configuration for applying a bokeh effect according to one or more aspects of the disclosure. A processor 104 of system 200 may communicate with image signal processor (ISP) 112 through a bi-directional bus and/or separate control and data lines. The processor 104 may control camera 202 through a camera control block 212 of the ISP 112 to obtain first image data at a first aperture size and second image data at a second aperture size. For example, when camera 202 is a variable aperture (VA) camera system, the processor 104 may execute a camera application to instruct camera 202 to configure to a first aperture size, obtain first image data from the camera 202, instruct camera 202 to configure to a second aperture size, and obtain second image data from the camera 202. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is f/2.0 is a larger aperture size than f/8.0.

The image data received from camera 202 may be processed in one or more blocks 214 of the ISP 112 and provided to the processor 104. The processor 104 may further process the image data to apply effects based on image data captured at multiple aperture sizes. In some embodiments, a bokeh effect may be applied using image data captured at multiple aperture sizes to provide a more realistic bokeh effect that more closely resembles the bokeh effect obtained by camera lenses with a desired aperture size. For example, first image data captured at a first aperture size of f/2.0 and second image data captured at a second aperture size of f/2.4 may be used to apply a bokeh effect of a simulated aperture size of f/1.4 than obtainable with image data from a single aperture size.

The processor 104 may include a focus map generator 222 and a bokeh applicator 224. The focus map generator 222 may determine a desired focus amount for portions of a scene, wherein the focus amount is determined to match a bokeh effect for a desired aperture size. The focus map may be based on a depth map describing the distance of objects in a scene from the camera 202. The depth map may be determined from image data obtained at two or more aperture sizes. The focus map generator 222 provides the focus map to the bokeh applicator 224, which also receives the image data collected at two or more aperture sizes. The bokeh applicator 224 determines output image frames 204 based on the focus map and the image data obtained at various aperture sizes. The output image frames may be stored in memory 106, which may be later recorded to another memory, such as a non-volatile memory, transmitted through a network adaptor, and/or output to a display device. Although not shown, other logic and memory circuitry may be present in the system 200. For example, a buffer may be present between the processor 104 and the ISP 112 or between the ISP 112 and the camera 202. As another example, additional processing circuitry may be present in processor 104 for applying additional effects (e.g., lighting, color casting, high dynamic range (HDR) merge) to the image data. In some embodiments, the processing circuitry that provides the functionality of the bokeh applicator 224 may be reconfigured to provide the functionality of the additional effects. In some embodiments, the processing circuitry that provides the functionality of focus map generator 222 and/or bokeh applicator 224 may be embedded in a different component, such as the ISP 112, a DSP, a ASIC, or other custom logic circuit.

Figure 3:
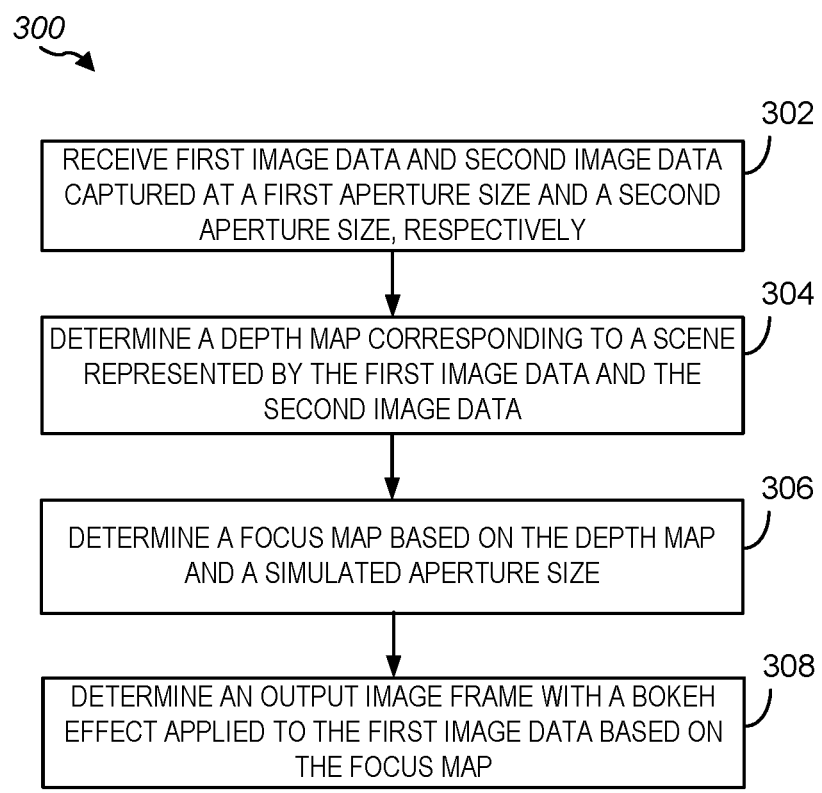
FIG. 3 shows a flow chart of an example method for applying a bokeh effect with a variable aperture (VA) camera system according to one or more aspects of the disclosure.

The system 200 of FIG. 2 may be configured to perform the operations described with reference to FIG. 3 to determine output image frames. FIG. 3 shows a flow chart of an example method for applying a bokeh effect with a variable aperture (VA) camera system according to one or more aspects of the disclosure. A method 300 includes, at block 302, receiving first image data and second image data captured at a first aperture size and a second aperture size, respectively. The first and second image data may represent the same scene such as by being captured near in time, such as sequentially, from a same or similar viewpoint, such that the objects in the scene are in identical or similar locations in the first image data and in the second image data.

The first and second image data may be captured by a variable aperture (VA) camera system. In a variable aperture (VA) camera system, block 302 may include configuring the camera 202 with the first aperture size to obtain first image data and subsequently configuring the camera 202 with the second aperture size to obtain second image data. In other camera systems with multiple fixed aperture sizes, block 302 may include capture image data from multiple cameras, each with different aperture sizes. Capturing image data from a single camera system with variable aperture (VA) capability, or other techniques for adjusting an amount of light reaching the image sensor, may be desirable over multiple camera systems. For example, multiple camera systems may have different fields of view, different alignment, and different light and color sensitivities. These differences may need to be compensated prior to merging image data from the multiple camera systems. When image data is obtained from a single camera system, these alignment and other challenges may be reduced or avoided.

At block 304, a depth map is determined. The depth map may be a set of values, such as arranged in an array or multiple arrays (e.g., a matrix or table), with each value representing a portion of a scene and the pixel or pixels in that portion of the scene. Thus, image data organized in image frames of N×M pixels may have a corresponding depth map of K×L values, in which N is an integer multiple of K and M is an integer multiple of L. The values indicate distances between an image sensor recording the image data and objects in the first scene. The depth map may be determined from the first image data and the second image data received at block 302, such as described with reference to FIG. 4, FIG. 5, FIG. 6, or FIG. 7. For example, the depth map may be a blur map indicating an amount of blur for a corresponding portion of the scene. Depth maps as described with respect to block 304 may include any representation of depth, regardless of whether the units of the values in the depth maps are distances.

At block 306, a focus map may be determined based on the depth map and a simulated aperture size. The simulated aperture size may be the desired aperture size for representing the scene, and may be input by a user into a camera application executing on the processor 104. The focus map may use predetermined information regarding a camera system at the simulated aperture size that reflects a sharpness of an image at various depths. The values in the depth map may be combined with the predetermined information to determine focus map values indicating an amount of blur at the simulated aperture size for the corresponding distances in the depth map between the image sensor and the objects in the scene.

At block 308, output image frames are determined from the focus map and the first image data. For example, the output image frames may be determined by applying a blurring algorithm to the first image data with a blur strength based on the corresponding portion of the focus map. In some embodiments, the output image frames are also based on the second image data. For example, output image frames may be determined by blending the first image data with corresponding data of the second image data based on the focus map, in which the weights assigned to the first image data and the second image data in the blending are based on the focus map. The resulting output image frame comprises a portion blurred based on the focus map to obtain a photograph corresponding to the simulated aperture size. The blurred portions may provide an appearance to the photograph that reflects the bokeh generated by a lens with a different aperture size than either of the first aperture size or the second aperture size of block 402. The larger aperture size may be larger than that available with the camera system that obtained the first and second image data, allowing obtaining image characteristics similar to a more expensive, larger camera system without the added expense and size of the higher aperture camera system.

Figure 4:
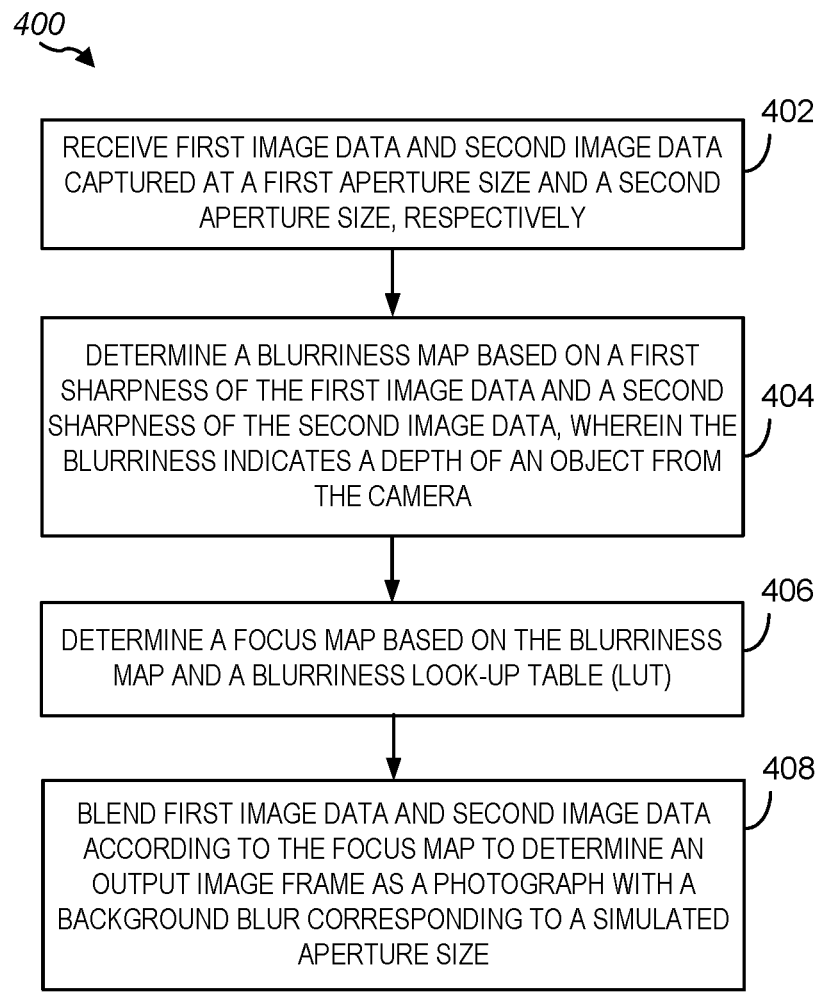
FIG. 4 shows a flow chart of an example method for applying a bokeh effect using sharpness values according to one or more aspects of the disclosure.
Figure 5:
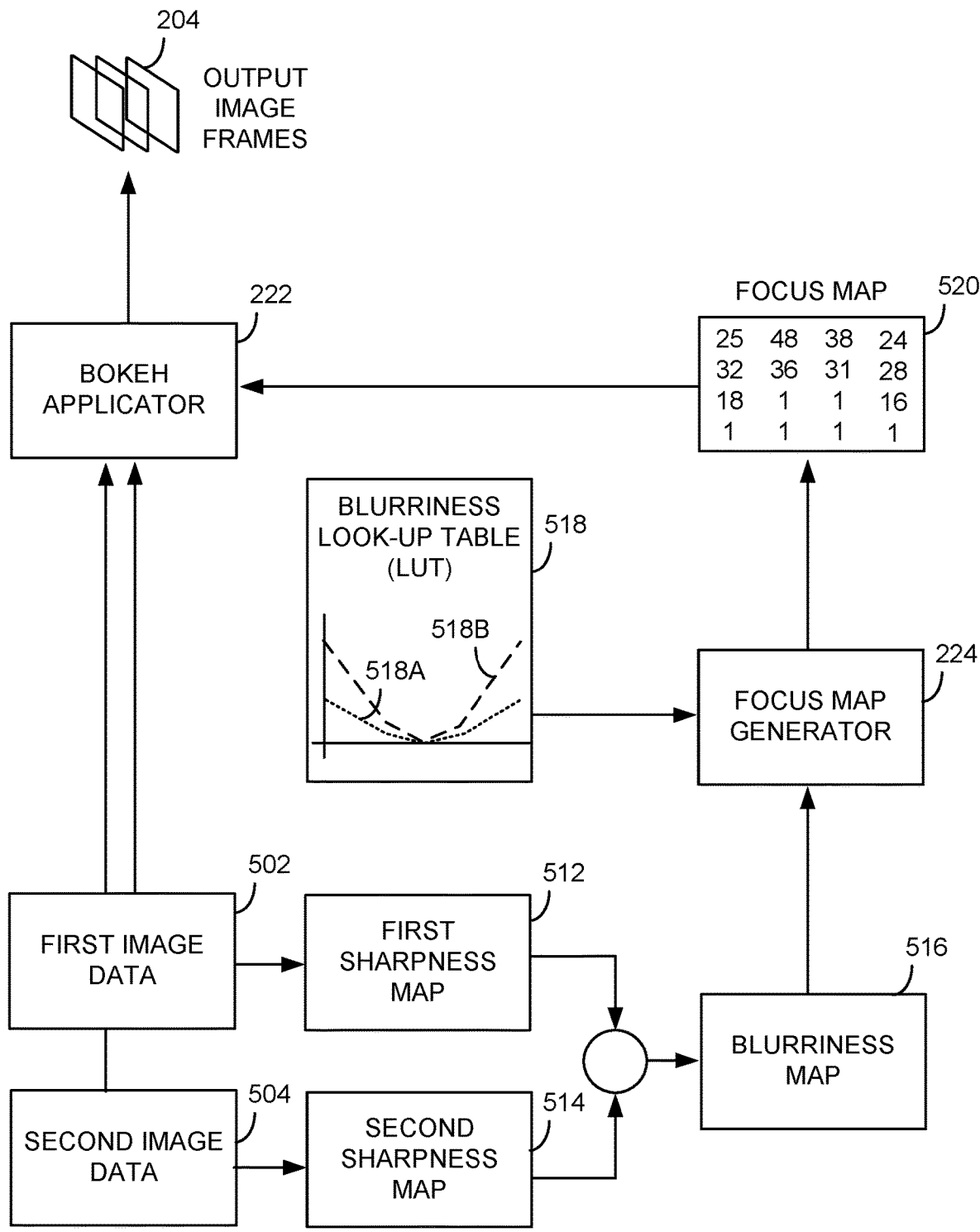
FIG. 5 shows a block diagram of an example processing configuration for applying a bokeh effect using sharpness values according to one or more aspects of the disclosure.

Some embodiments for the image processing described in FIG. 3 are based on image-based contrast calculations as described with reference to FIG. 4. FIG. 4 shows a flow chart of an example method for applying a bokeh effect using sharpness values according to one or more aspects of the disclosure. A block diagram illustrating the image data processing of FIG. 4 is shown in FIG. 5. FIG. 5 shows a block diagram of an example processing configuration for applying a bokeh effect using sharpness values according to one or more aspects of the disclosure.

A method 400 includes, at block 402, receiving first image data 502 captured at a first aperture size and second image data 504 captured at a second aperture size. The first and second image data may be received after capture as described with reference to block 302 of FIG. 3. The processing of method 400 may be performed in real-time with capture of the first and second image data to generate, for example, a preview image on a display. The processing of method 400 may also or alternatively be performed after capture of the first and second image data on the image capture device and/or by a remote device.

At block 404, a blurriness map is determined based on a first sharpness of the first image data and a second sharpness of the second image data. The blurriness map may indicate a depth of an object from the camera. The first sharpness may be a first sharpness map 512 determined from the first image data 502, and the second sharpness may be a second sharpness map 514 determined from the second image data 504. Like the depth map described above, image data organized in image frames of N×M pixels may have a corresponding sharpness map of K×L values, in which N is an integer multiple of K and M is an integer multiple of L. The values in the sharpness map may indicate distances between an image sensor recording the image data and objects in the first scene because portions of the scene closer to a focus point of the camera are sharper. Sharpness may measure the clarity level of detail of an image. In some embodiments, sharpness may be determined as a function of its Laplacian, normalized by the local average luminance in surrounding pixels according to the following equation:

$$SH = \sum_{x,y} \frac{LP(x, y)}{\mu_{xy}}, LP(x, y) = \frac{\partial^2 L}{\partial x^2} + \frac{\partial^2 L}{\partial y^2}$$

wherein $\mu_{xy}$ denotes an average luminance around the pixel (x,y). In some embodiments, the blurriness map may be normalized, such as to values between 0 and 100 with a higher value indicating less blurriness. In some embodiments, blurriness map values may be calculated from sharpness map values according to the following equation:

Blurriness=100−abs (SH1−SH2), wherein SH1 is the sharpness value for the small aperture image data and SH2 is the sharpness value for the corresponding large aperture image data. Due to the shallow DOF with larger aperture sizes, the image data obtained at the larger aperture size may be sharp in the portions of the desired subject, while in contrast the image data obtained at the smaller aperture size would have a larger portion with high sharpness. A blurriness analyzer determines the blurriness map 516 from the first sharpness map 512 and the second sharpness map 514.

At block 406, a focus map may be determined based on the blurriness map and a blurriness look-up table. A focus map generator 224 may receive the blurriness map 516 and a blurriness look-up table (LUT) 518 (or other predetermined relationship between aperture size and depth). The LUT 518 may provide relationships 518A and 518B mapping blurriness to depth for different aperture sizes. Relationship 518A may correspond to a smaller aperture size that the relationship 518B, based on its lower blurriness at higher depths. The LUT 518 may include one or more relationships, which may be stored as a table, but predetermined relationships may alternatively or additionally be stored as representative equations. The focus map generator 224 determines focus map 520 by mapping the blurriness map to the focus map using a relationship in the LUT 518 corresponding to the simulated aperture size. In some embodiments, the relationship for the simulated aperture size may not be present in LUT 518 and the relationship may instead be interpolated, or otherwise estimated, from other relationships present in LUT 518.

At block 408, the first image data 502 and second image data 504 may be blended by the bokeh applicator 222 based on the focus map 520 to determine an output image frame. The output image frames 204 may be photographs or a video sequence with a background (e.g., bokeh) blur corresponding to the simulated aperture size. The blending may apply heavier weights to the large aperture image data for the background portions based on larger focus map scores, and the blending may apply heavier weights to the small aperture image data for the foreground (or subject) portions based on smaller focus map scores. Although the processing of two image data at two aperture sizes is described for generating individual output image frames, the processing may similarly involve three or more image data at additional aperture sizes.

Figure 6:
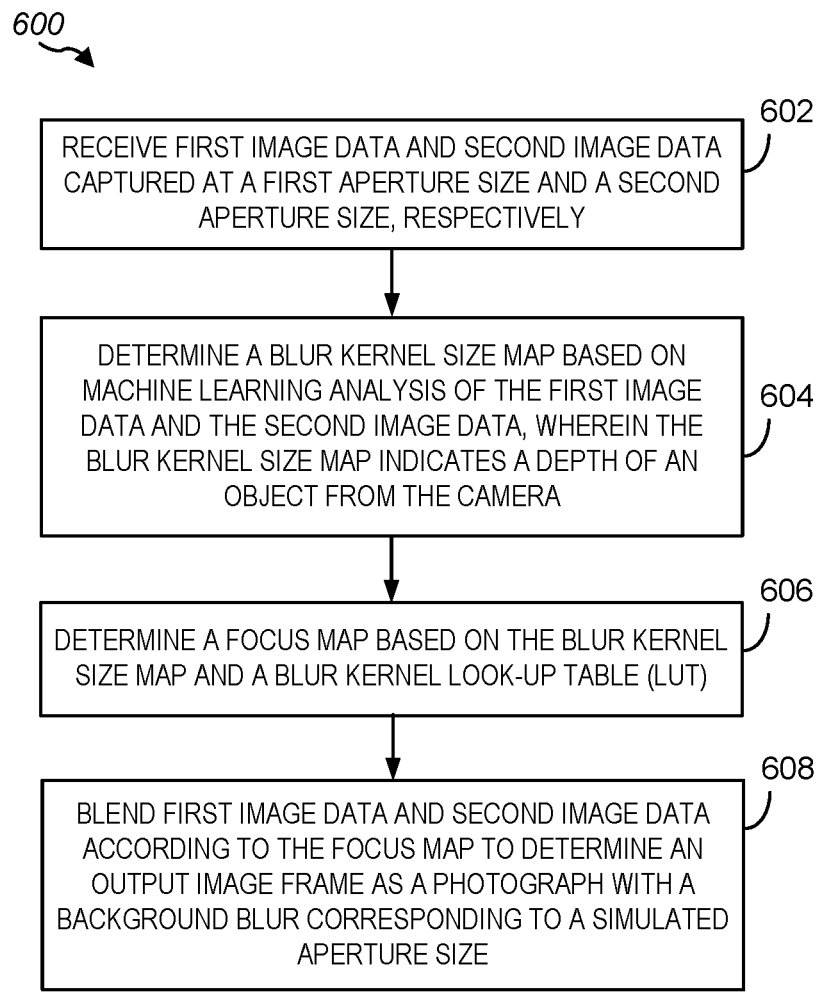
FIG. 6 shows a flow chart of an example method for applying a bokeh effect with a variable aperture (VA) camera system using machine learning according to one or more aspects of the disclosure.
Figure 7:
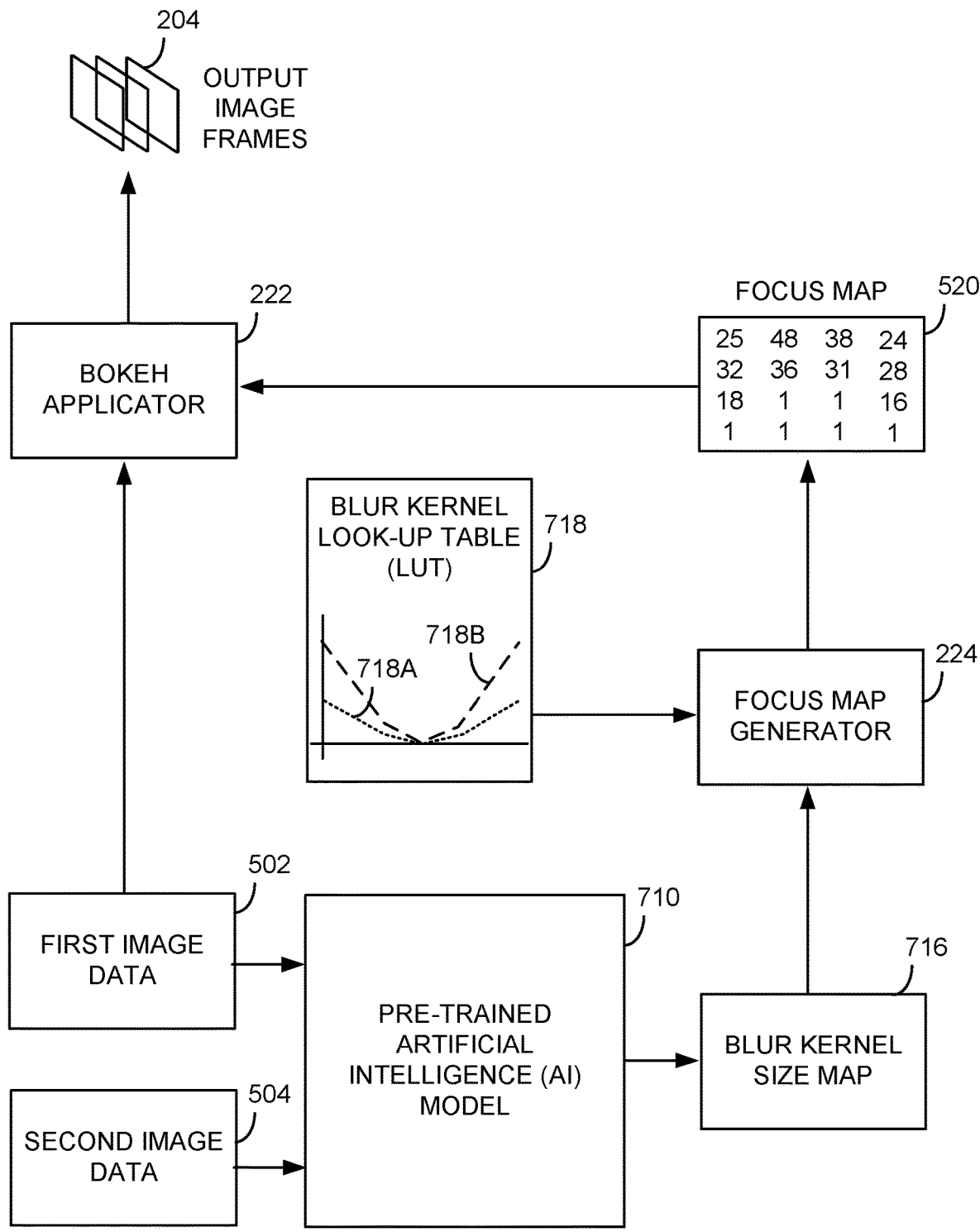
FIG. 7 shows a block diagram of an example processing configuration for applying a bokeh effect using machine learning according to one or more aspects of the disclosure.

Some embodiments for the image processing described in FIG. 3 are based on machine learning-based calculations as described with reference to FIG. 6. FIG. 6 shows a flow chart of an example method for applying a bokeh effect with a variable aperture (VA) camera system using machine learning according to one or more aspects of the disclosure. A block diagram illustrating the image data processing of FIG. 6 is shown in FIG. 7. FIG. 7 shows a block diagram of an example processing configuration for applying a bokeh effect using machine learning according to one or more aspects of the disclosure.

A method 600 includes, at block 602, receiving first image data 502 captured at a first aperture size and second image data 504 captured at a second aperture size. The first and second image data may be received as streaming data during capture from the camera system as described with reference to block 302 of FIG. 3. The processing of method 600 may be performed in real-time with capture of the first and second image data to generate, for example, a preview image on a display. The processing of method 600 may also or alternatively be performed after capture of the first and second image data on the image capture device and/or by a remote device.

At block 604, a blur kernel size map is determined based on machine learning analysis in a pre-trained artificial intelligence (AI) model 710 of the first image data 502 and the second image data 504. The blur kernel size map may indicate a depth of an object from the camera. A blur kernel may be a small matrix of values representative of blurring applied to a portion of image data. An AI model may be trained using images captured at different aperture sizes to prepare an offline model. That model may be applied to the image data 502 and 504 to determine a representative blur kernel size for different portions of the image data. Like the depth map described above, image data organized in image frames of N×M pixels may have a corresponding blur kernel size map of K×L values, in which N is an integer multiple of K and M is an integer multiple of L. The values in the blur kernel size map may indicate distances between an image sensor recording the image data and objects in the first scene because portions of the scene closer to a focus point of the camera have a smaller blur kernel size. In some embodiments, the AI model 710 is a Resnet-34 model.

At block 606, a focus map may be determined based on the blur kernel size map and a blur kernel size look-up table. A focus map generator 224 may receive the blur kernel size map 716 and a blur kernel size look-up table (LUT) 718 (or other predetermined relationship between aperture size and depth). The LUT 718 may provide relationships 718A and 718B mapping blur kernel size to depth for different aperture sizes. Relationship 718A may correspond to a smaller aperture size that the relationship 718B, based on its smaller blur kernel size at higher depths. The LUT 718 may include one or more relationships, which may be stored as a table, but predetermined relationships may alternatively or additionally be stored as representative equations. The focus map generator 224 determines focus map 520 by mapping the blur kernel size map 716 to the focus map 520 using a relationship in the LUT 718 corresponding to the simulated aperture size. In some embodiments, the relationship for the simulated aperture size may not be present in LUT 718 and the relationship may instead be interpolated, or otherwise estimated, from other relationships present in LUT 718. For example, predetermined data may be available for aperture sizes of f/2.0 and f/2.4, and when a simulated aperture size of f/1.4 is selected by the user the predetermined data for f/2.0 and f/2.4 may be interpolated to obtain a relationship for f/1.4.

At block 608, the first image data 502 and second image data 504 may be blended by the bokeh applicator 222 based on the focus map 520 to determine an output image frame. The output image frames 204 may be photographs or a video sequence with a background (e.g., bokeh) blur corresponding to the simulated aperture size. The blending may apply heavier weights to the large aperture image data for the background portions based on larger focus map scores, and the blending may apply heavier weights to the small aperture image data for the foreground (or subject) portions based on smaller focus map scores. Although the processing of two image data at two aperture sizes is described for generating individual output image frames, the processing may similarly involve three or more image data at additional aperture sizes.

The bokeh effect applied according to embodiments describe above using a focus map 520 and a predefined relationship, such as the look-up tables 518 and 718, provide a more natural looking bokeh. The bokeh will appear closer to that generated naturally by an optical lens with large aperture, in part, based on the predefined relationships. Conventional bokeh effects may assume a linear relationship between blur and depth from a focus point of the camera. However, optical lenses generally have non-linear behavior, as shown in the relationships 518A, 518B, 718A, and 718B. Thus, the predefined data provide more realistic natural bokeh effect. Further, the focus map generated from image data captured at two different aperture sizes provides a more accurate representation of the depths of objects in the scene allowing for a more realistic application of the bokeh effect.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform operations including receiving first image data captured at a first aperture size and second image data captured at a second aperture size, each of the first image data and the second image data representing a first scene; determining a depth map corresponding to the first scene based on the first image data and the second image data, the depth map comprising first values indicating distances between an image sensor recording the first image data and objects in the first scene; determining a focus map based on the depth map and a simulated aperture size different from the first aperture size and the second aperture size, the focus map comprising second values indicating an amount of blur at the simulated aperture size for corresponding distances between the image sensor recording the first image data and the objects in the first scene; and determining an output image frame based on the focus map, the first image data, and the second image data. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, determining the depth map comprises determining a blur map corresponding to the first scene based on the first image data and the second image data.

In a third aspect, in combination with one or more of the first aspect or the second aspect, determining the blur map comprises determining first sharpness values for the first image data and determining second sharpness values for the second image data, wherein the blur map comprises blur values based on the first sharpness values and the second sharpness values.

In a fourth aspect, in combination with one or more of the first aspect through the third aspect, determining the blur map comprises determining, based on supervised machine learning, blur kernel size values corresponding to the distances between the image sensor recording the first image data and the objects in the first scene.

In a fifth aspect, in combination with one or more of the first aspect through the fourth aspect, determining the focus map comprises determining the second values based on the depth map and a predetermined relationship between depth and blur.

In a sixth aspect, in combination with one or more of the first aspect through the fifth aspect, the image sensor is configured as a variable aperture (VA) camera system.

In a seventh aspect, in combination with one or more of the first aspect through the sixth aspect, the image sensor captured the first image data and the second image data.

In an eighth aspect, in combination with one or more of the first aspect through the seventh aspect, determining the depth map comprises determining a blurriness map comprises determining first sharpness values for the first image data and determining second sharpness values for the second image data, wherein the blur map comprises blur values based on the first sharpness values and the second sharpness values.

In a ninth aspect, in combination with one or more of the first aspect through the eighth aspect, determining the focus map comprises determining the focus map based on the blurriness map and a predetermined relationship between aperture size and depth.

In a tenth aspect, in combination with one or more of the first aspect through the ninth aspect, determining the output image frame comprises blending the first image data with corresponding data of the second image data based on the focus map.

In an eleventh aspect, in combination with one or more of the first aspect through the tenth aspect, determining the output image frame comprises determining the output image frame comprising a portion blurred based on the focus map to obtain a photograph corresponding to the simulated aperture size.

In a twelfth aspect, in combination with one or more of the first aspect through the eleventh aspect, determining the depth map comprises determining, based on supervised machine learning, blur kernel size values.

In a thirteenth aspect, in combination with one or more of the first aspect through the twelfth aspect, determining the focus map comprises determining the focus map based on the blur kernel size values and predetermined relationship between blur kernel size and depth.

In a fourteenth aspect, in combination with one or more of the first aspect through the thirteenth aspect, determining the output image frame comprises blending the first image data with corresponding data of the second image data based on the focus map.

In a fifteenth aspect, in combination with one or more of the first aspect through the fourteenth aspect, determining the output image frame comprises determining the output image frame comprising a portion blurred based on the focus map to obtain a photograph corresponding to the simulated aperture size.

In a sixteenth aspect, in combination with one or more of the first aspect through the fifteenth aspect, the operations are performed by an image capture device comprising a variable aperture (VA) camera system configured to capture the first image data at the first aperture size and the second image data at the second aperture size.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes .1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving first image data captured at a first aperture size and second image data captured at a second aperture size, each of the first image data and the second image data representing a first scene;
   determining a depth map corresponding to the first scene based on the first image data and the second image data, the depth map comprising first values indicating distances between an image sensor recording the first image data and objects in the first scene;
   determining a focus map based on the depth map and a simulated aperture size different from the first aperture size and the second aperture size, the focus map comprising second values indicating an amount of blur at the simulated aperture size for corresponding distances between the image sensor recording the first image data and the objects in the first scene; and
   determining an output image frame based on the focus map, the first image data, and the second image data.

2. The method of claim 1, wherein determining the depth map comprises determining a blur map corresponding to the first scene based on the first image data and the second image data.

3. The method of claim 2, wherein determining the blur map comprises determining first sharpness values for the first image data and determining second sharpness values for the second image data, wherein the blur map comprises blur values based on the first sharpness values and the second sharpness values.

4. The method of claim 2, wherein determining the blur map comprises determining, based on supervised machine learning, blur kernel size values corresponding to the distances between the image sensor recording the first image data and the objects in the first scene.

5. The method of claim 2, wherein determining the focus map comprises determining the second values based on the depth map and a predetermined relationship between depth and blur.

6. The method of claim 1, wherein the image sensor captured the first image data and the second image data, and wherein the image sensor is configured as a variable aperture (VA) camera system.

7. The method of claim 6, wherein:
- determining the depth map comprises determining a blurriness map comprises determining first sharpness values for the first image data and determining second sharpness values for the second image data, wherein the blur map comprises blur values based on the first sharpness values and the second sharpness values;
- determining the focus map comprises determining the focus map based on the blurriness map and a predetermined relationship between aperture size and depth; and
- determining the output image frame comprises blending the first image data with corresponding data of the second image data based on the focus map.

8. The method of claim 7, wherein determining the output image frame comprises determining the output image frame comprising a portion blurred based on the focus map to obtain a photograph corresponding to the simulated aperture size.

9. The method of claim 6, wherein:
- determining the depth map comprises determining, based on supervised machine learning, blur kernel size values;
- determining the focus map comprises determining the focus map based on the blur kernel size values and predetermined relationship between blur kernel size and depth; and
- determining the output image frame comprises blending the first image data with corresponding data of the second image data based on the focus map.

10. The method of claim 9, wherein determining the output image frame comprises determining the output image frame comprising a portion blurred based on the focus map to obtain a photograph corresponding to the simulated aperture size.

11. An apparatus, comprising:
- a memory storing processor-readable code; and
- at least one processor coupled to the memory, the at least one processor configured to execute the processor-readable code to cause the at least one processor to perform operations including:
  - receiving first image data captured at a first aperture size and second image data captured at a second aperture size, each of the first image data and the second image data representing a first scene;
  - determining a depth map corresponding to the first scene based on the first image data and the second image data, the depth map comprising first values indicating distances between an image sensor recording the first image data and objects in the first scene;
  - determining a focus map based on the depth map and a simulated aperture size different from the first aperture size and the second aperture size, the focus map comprising second values indicating an amount of blur at the simulated aperture size for corresponding distances between the image sensor recording the first image data and the objects in the first scene; and
  - determining an output image frame based on the focus map, the first image data, and the second image data.

12. The apparatus of claim 11, wherein determining the depth map comprises determining a blur map corresponding to the first scene based on the first image data and the second image data.

13. The apparatus of claim 12, wherein determining the blur map comprises determining first sharpness values for the first image data and determining second sharpness values for the second image data, wherein the blur map comprises blur values based on the first sharpness values and the second sharpness values.

14. The apparatus of claim 12, wherein determining the blur map comprises determining, based on supervised machine learning, blur kernel size values corresponding to the distances between the image sensor recording the first image data and the objects in the first scene.

15. The apparatus of claim 12, wherein determining the focus map comprises determining the second values based on the depth map and a predetermined relationship between depth and blur.

16. The apparatus of claim 11, further comprising a variable aperture (VA) camera system configured to capture the first image data at the first aperture size and the second image data at the second aperture size.

17. The apparatus of claim 16, wherein:
- determining the depth map comprises determining a blurriness map comprises determining first sharpness values for the first image data and determining second sharpness values for the second image data, wherein the blur map comprises blur values based on the first sharpness values and the second sharpness values;
- determining the focus map comprises determining the focus map based on the blurriness map and a predetermined relationship between aperture size and depth; and
- determining the output image frame comprises blending the first image data with corresponding data of the second image data based on the focus map.

18. The apparatus of claim 17, wherein determining the output image frame comprises determining the output image frame comprising a portion blurred based on the focus map to obtain a photograph corresponding to the simulated aperture size.

19. The apparatus of claim 16, wherein:
- determining the depth map comprises determining, based on supervised machine learning, blur kernel size values;
- determining the focus map comprises determining the focus map based on the blur kernel size values and predetermined relationship between blur kernel size and depth; and
- determining the output image frame comprises blending the first image data with corresponding data of the second image data based on the focus map.

20. The apparatus of claim 19, wherein determining the output image frame comprises determining the output image frame comprising a portion blurred based on the focus map to obtain a photograph corresponding to the simulated aperture size.

21. A non-transitory computer-readable medium storing instructions that, when executed by a processor, cause the processor to perform operations comprising:
- receiving first image data captured at a first aperture size and second image data captured at a second aperture size, each of the first image data and the second image data representing a first scene;
- determining a depth map corresponding to the first scene based on the first image data and the second image data, the depth map comprising first values indicating distances between an image sensor recording the first image data and objects in the first scene;

determining a focus map based on the depth map and a simulated aperture size different from the first aperture size and the second aperture size, the focus map comprising second values indicating an amount of blur at the simulated aperture size for corresponding distances between the image sensor recording the first image data and the objects in the first scene; and determining an output image frame based on the focus map, the first image data, and the second image data.

22. The non-transitory computer-readable medium of claim 21, wherein determining the depth map comprises determining a blur map corresponding to the first scene based on the first image data and the second image data.

23. The non-transitory computer-readable medium of claim 22, wherein determining the blur map comprises determining first sharpness values for the first image data and determining second sharpness values for the second image data, wherein the blur map comprises blur values based on the first sharpness values and the second sharpness values.

24. The non-transitory computer-readable medium of claim 22, wherein determining the blur map comprises determining, based on supervised machine learning, blur kernel size values corresponding to the distances between the image sensor recording the first image data and the objects in the first scene.

25. The non-transitory computer-readable medium of claim 22, wherein determining the focus map comprises determining the second values based on the depth map and a predetermined relationship between depth and blur.

26. The non-transitory computer-readable medium of claim 21, wherein the image sensor captured the first image data and the second image data, and wherein the image sensor is configured as a variable aperture (VA) camera system.

27. The non-transitory computer-readable medium of claim 26, wherein:

determining the depth map comprises determining a blurriness map comprises determining first sharpness values for the first image data and determining second sharpness values for the second image data, wherein the blur map comprises blur values based on the first sharpness values and the second sharpness values;

determining the focus map comprises determining the focus map based on the blurriness map and a predetermined relationship between aperture size and depth; and determining the output image frame comprises blending the first image data with corresponding data of the second image data based on the focus map.

28. The non-transitory computer-readable medium of claim 27, wherein determining the output image frame comprises determining the output image frame comprising a portion blurred based on the focus map to obtain a photograph corresponding to the simulated aperture size.

29. The non-transitory computer-readable medium of claim 26, wherein:

determining the depth map comprises determining, based on supervised machine learning, blur kernel size values;

determining the focus map comprises determining the focus map based on the blur kernel size values and predetermined relationship between blur kernel size and depth; and determining the output image frame comprises blending the first image data with corresponding data of the second image data based on the focus map.

30. The non-transitory computer-readable medium of claim 29, wherein determining the output image frame comprises determining the output image frame comprising a portion blurred based on the focus map to obtain a photograph corresponding to the simulated aperture size.

* * * * *